(12) United States Patent
Browning et al.

(10) Patent No.: US 6,878,336 B1
(45) Date of Patent: Apr. 12, 2005

(54) PROCESS FOR FABRICATING THREE-DIMENSIONAL FIXTURES

(76) Inventors: Joshua Browning, 147 Juliand Rd., Greene, NY (US) 13778; Anthony Browning, 73 S. Chenango St., Greene, NY (US) 13778

( * ) Notice: Subject to any disclaimer, the term of this patent is extended or adjusted under 35 U.S.C. 154(b) by 161 days.

(21) Appl. No.: 09/932,779

(22) Filed: Aug. 20, 2001

(51) Int. Cl.[7] .................................................. B29C 51/10
(52) U.S. Cl. ..................... 264/553; 264/238; 264/248
(58) Field of Search .............................. 264/553, 554, 264/138, 238, 248

(56) References Cited

U.S. PATENT DOCUMENTS 3,156,012 A * 11/1964 Hritz ........................... 425/388
3,319,295 A * 5/1967 Jones-Hinto et al. ........ 425/388
5,074,770 A * 12/1991 Graefe ......................... 425/117
5,614,145 A * 3/1997 O'Kane ....................... 264/458
6,083,339 A * 7/2000 Peters et al. ................. 156/245
6,110,313 A * 8/2000 Ford ............................ 156/212

* cited by examiner

*Primary Examiner*—Edmund H. Lee
(74) *Attorney, Agent, or Firm*—Mark Levy & Associates

(57) ABSTRACT

A thermoforming method of fabricating a seamless, three-dimensional fixture capable of holding a liquid from a single sheet of "solid surface" material is described. The sheet is cut to desired dimensions, then heated to a desired temperature to make it malleable. The malleable material is then placed over a female or male mold, and formed to the shape of the fixture, utilizing a vacuum. The heated material is then allowed to conform to the mold shape until the desired deformity is achieved. The manufactured fixture is then allowed to cool in its restrained position, until rigid.

8 Claims, 4 Drawing Sheets

US 6,878,336 B1

PROCESS FOR FABRICATING THREE-DIMENSIONAL FIXTURES

FIELD OF THE INVENTION

The present invention relates to manufacturing processes and articles made by these processes and, more particularly, to a thermoforming method of fabricating three-dimensional solids, solid surface materials and acrylics that have a seamless depression or projection capable of holding a liquid and that simulate natural materials, such as stone, granite, or marble.

BACKGROUND OF THE INVENTION

In recent times, the use of artificial stone materials for kitchen counter-tops, basins, tubs, and other fixtures has become very popular with contractors and property owners alike. These materials have the look of granite, marble and other expensive stone materials, but are less costly to fabricate and shape. These artificial stone materials usually comprise acrylic and acrylic/alumina trihydrate (Wilsonart®, Gibraltar®, SSVTM, DuPont Corian®), and are also known in the trade as solid surface materials.

In the manufacture of bowls, tubs, counter-tops, and basins of artificial stone-like materials, some manufacturers laminate or chemically weld multiple pieces of solid surface sheet stock together, and then machine the pieces to the desired shape. Some manufacturers mold solid surface material using two-piece (male/female) molds to create a basic form, and then cut and splice pieces to the deformed shape to achieve the depth and size that they ultimately desire. These methods require more labor and machinery to finish the surfaces, such as sanding the laminated or welded item, and therefore are more time, labor, and material intensive. The intensive nature of these artificial materials has kept the cost of the end products high.

The present invention features a low-cost, thermoforming process that is used to make three-dimensional solid surface bowls, shower pans, trays, kitchen countertops, and basins. The inventors have discovered that thermoforming is a cost effective method for overcoming the prior art manufacturing limitations of these materials. The inventive process uses a flat, rigid sheet of solid surface product that is heated to a uniform temperature to make it malleable. The material is then placed over a female or male mold and formed to a predetermined shape utilizing vacuum. The heated material is allowed to conform to the mold shape without substantial restraint, until most of the desired deformity is achieved. At that point, movement of the material becomes restricted; the balance of the desired deformity is achieved through stretching. The manufactured component is then allowed to cool in its restrained position, until rigid.

This procedure produces a flange, which provides a point at which, for example, the bowl/shower pan can subsequently be chemically welded in either a convex or concave position. After cooling, the material is removed from the mold and chemically welded to a countertop or curb assembly, in either a horizontal or a vertical plane. A supporting plate is welded at the desired drain location. A drain hole is then machined at the drain location to accommodate the drain hardware.

The inventive process allows formation of a shower base, sink, bowl, or other fixture in one piece, which can retain its shape without losing its strength and integrity. Most particularly in the case of a shower base or tub, further strengthening can be achieved using polyurethane foam. The polyurethane foam can be poured or sprayed onto the solid surface material.

The inventive method is unique in that no other current process can fabricate solid surface fixtures in one piece using a vacuum and producing a flanged, seamless cost efficient fixture.

SUMMARY OF THE INVENTION

In accordance with the present invention, a fixture is fabricated from a solid surface material in one thermoforming process. The process uses a flat, rigid, single sheet of solid surface product that is heated to a uniform temperature to make it malleable. The material is then placed over a female or male mold, and formed to a predetermined shape utilizing a vacuum. The heated material is allowed to conform to the mold shape without substantial restraint, until most of the desired deformity is achieved. At that point, movement of the material becomes restricted; the balance of the desired deformity is achieved through stretching. The manufactured component is then allowed to cool in its restrained position, until rigid. This procedure produces a flange, which provides a point at which, for example, the bowl/shower pan can subsequently be chemically welded in either a convex or concave position. After cooling, the material is removed from the mold and chemically welded to a countertop or curb assembly, in either a horizontal or a vertical plane. A supporting plate is welded at the desired drain location. A drain hole is then machined at the drain location to accommodate the drain hardware.

It is an object of the present invention to provide an improved process for fabricating household fixtures of simulated stone or of substantially solid colors.

It is another object of this invention to provide a one piece method for manufacturing fixtures of simulated stone or of substantially solid colors.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the invention features a thermoforming method of fabricating a fixture comprising a single sheet of solid surface material. The sheet is heated to a uniform temperature to make it malleable. The malleable material is then placed over a female or male mold, and formed to the shape of the fixture, utilizing a vacuum. The heated material is then allowed to conform to the mold shape without significant restraint, until the desired deformity is substantially achieved. At that point, movement of the material becomes restricted; the balance of the desired deformity is achieved through stretching. The manufactured fixture is then allowed to cool in its restrained position, until rigid.

Figure 2:
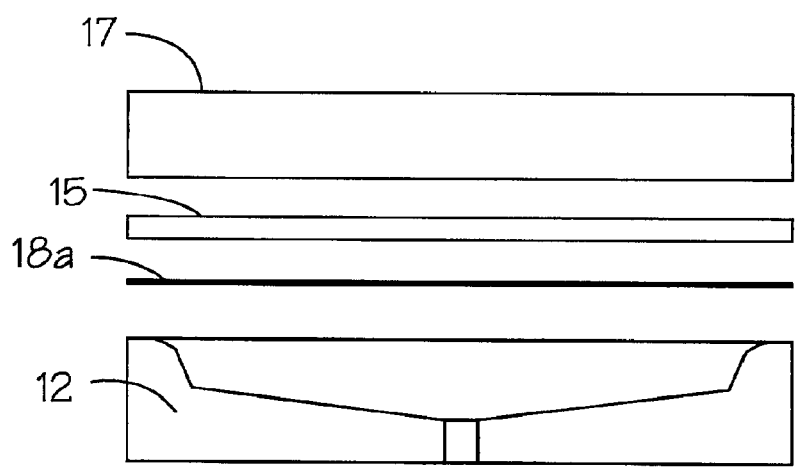
FIG. 2 depicts an exploded, front view of the mold of FIG. 1, with its component parts.
Figure 4:
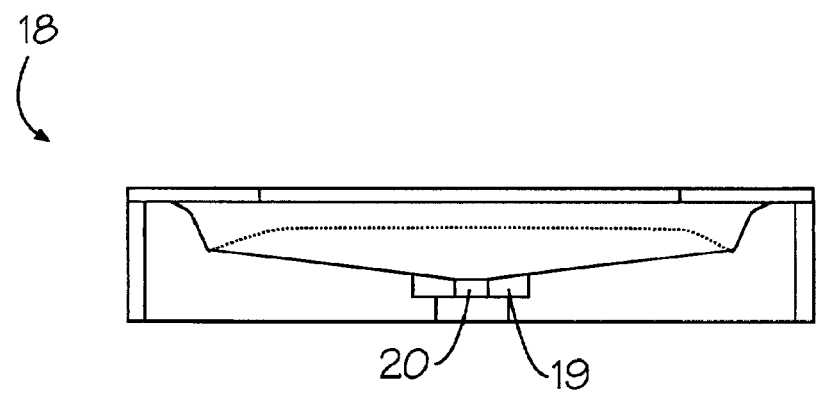
FIG. 4 illustrates a cross-sectional view of a shower pan fabricated in accordance with the method of this invention.
Figure 5:
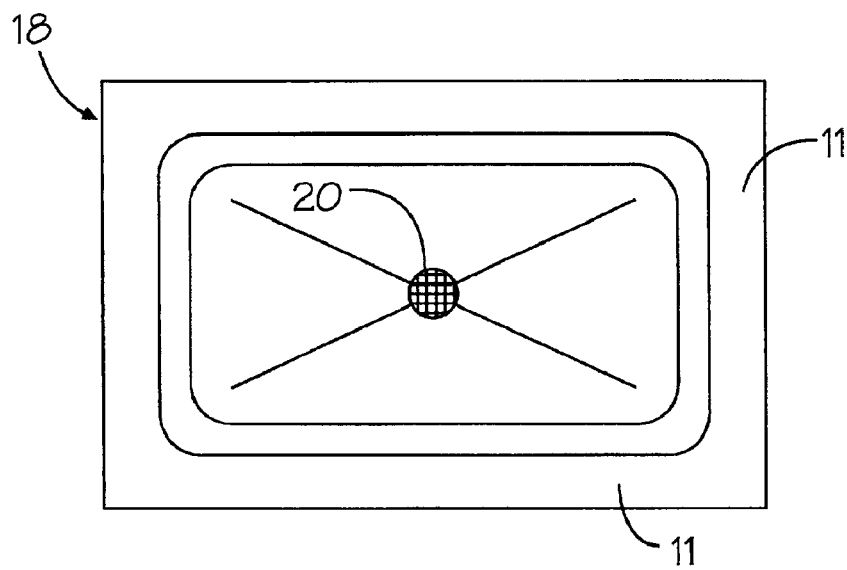
FIG. 5 depicts a plan view of the shower pan shown in FIG. 4.
Figure 6:
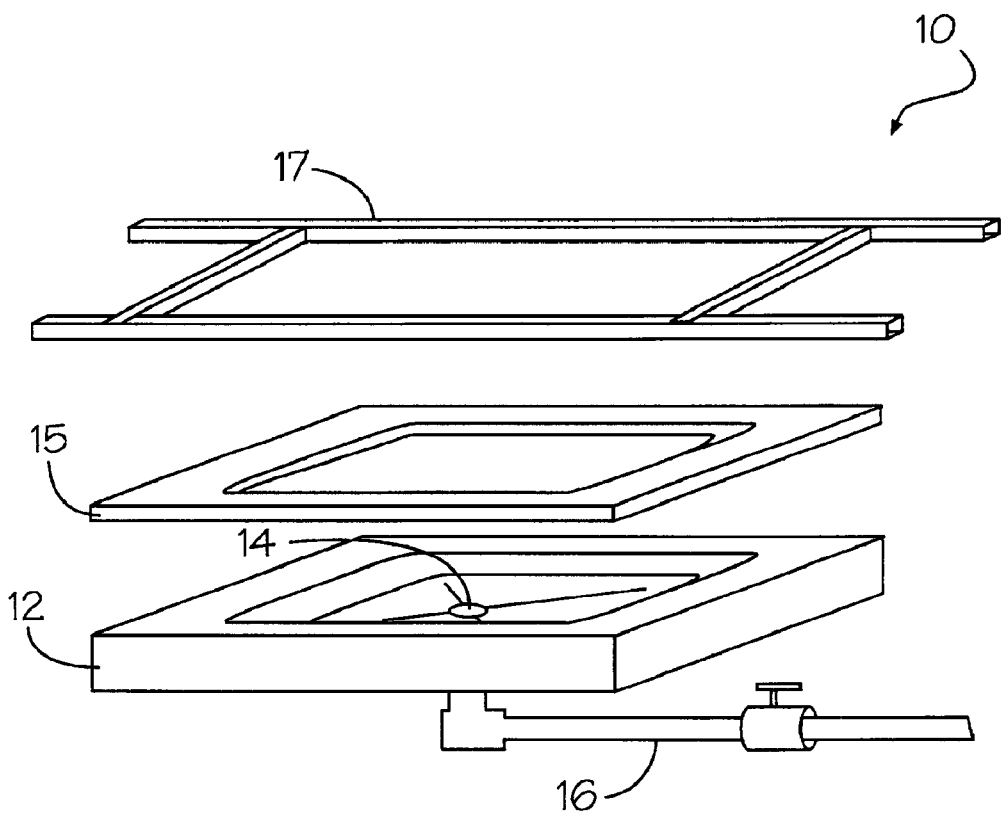
FIG. 6 shows a perspective, exploded, schematic view of the mold and its component parts depicted in FIG. 2.
Figure 7:
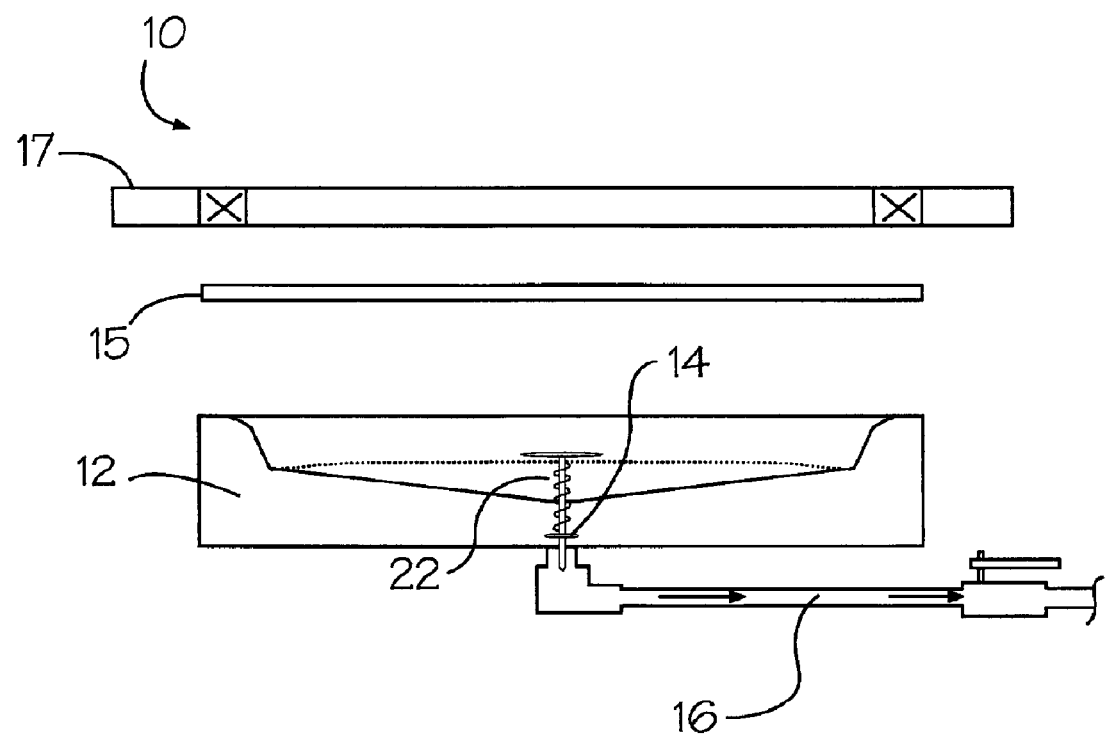
FIG. 7 illustrates a schematic, sectional view of the mold and its components, shown in FIG. 6.

Now referring to FIGS. 2, 6, and 7, the mold fixture components 10 used in the fabrication of a shower pan 18, as shown in FIGS. 4 and 5, in accordance with the present invention, are illustrated. The mold components used in the thermoforming process of the invention comprise a medium density fiberboard (MDF) mold 12, which is attached at its center hole 14 to a vacuum-providing conduit 16. It should be understood that other easily shaped and non-heat retentive materials can be used in place of or in conjunction with MDF material. The shower pan 18 or other fixture is thermoformed using a single sheet 18a of solid surface material. The fixture that can be fabricated by the process can comprise a bowl (including but not limited to toilets, tubs, basins, etc.), sink, tray, birdbath, shower pan, etc., or any other article requiring the forming of a depression or projection in a solid surface material that can hold a liquid.

The inventive method comprises the following steps:

Step 1: A single sheet of solid surface material 18a (FIG. 2) is cut to a desired size that corresponds to the size of the shower pan or other product that is to be fabricated.

Step 2: The piece of material 18a is placed into a heating device (oven) to raise the temperature of the piece to a desired thermoforming temperature, the temperature gradient being in the approximate range of between 280° F.–355° F. In accordance with certain solid surface material manufacturers' instructions, the material may be annealed prior to and/or after performing step 2.

The piece of material being used to form the bowl/shower pan is heated for a period dependent upon its thickness. For example, ⅛" of SSV™ material is heated for a minimum of 6 minutes within the aforementioned temperature range. The sheet material 18a can remain for an indefinite period in this heated state, until the operator is ready to remove it, place it in the mold 12, and apply a vacuum 16 to the mold 12.

The oven used can be any one of various types that are commercially available. A convection oven, a heated platen oven, or a gas oven can be used to achieve the desired formability.

A typical solid surface material includes an acrylic plastic with a filler of alumina trihydrate of 20 to 85% by weight. The material is manufactured under the various trade names including but not limited to: Wilsonart®, Gibraltar®, SSV™, and Dupont Corian®. Typical material thicknesses useful for thermoforming in accordance with the method of this invention, include ⅛ inch, ¼ inch, ⅜ inch and ½ inch.

Step 3: Once heated to the desired temperature, the material 18a is malleable, and is placed into position over the three-dimensional mold 12. A retention or slip ring 15 is then placed over and surrounding the periphery of the heated piece 18a to be formed.

Step 4: An appropriate amount of vacuum is then gradually applied, with only the weight of the retention ring 15 resting upon the material. The material 18a is vacuum formed into the mold 12, to a point of substantial deformity. The deformity is virtually unrestricted by pressure around its perimeter. When the substantially desired deformity is attained, full pressure is applied to the retention ring 15. Full pressure causes the top of the shower pan flange portion 11, shown in FIG. 5, to remain flat and wrinkle free. The deformity of the material should occur slowly (approx. 5–10 sec.) in order to prevent excessive stretching of the material. Excessive stretching is not desirable, because it results in whiting at the edges and corners. Excessive stretching is also undesirable aesthetically and, additionally, may weaken the material.

Step 5: Both the retention ring 15 and the vacuum restrain the deformed piece of solid surface material 18a until it cools to the point where it will retain its shape. This is dependent on the temperature to which it has been heated, the thickness of the material used, and ambient temperature.

Step 6: The pressure is removed. The vacuum is turned off and the final deformed and shaped material 18a is removed from the mold 12.

A frame 17 (e.g., wooden, metal, etc.) is used to hold the retention ring 15 in place. This procedure produces a flange 11, as aforementioned, which provides a point at which, for example, the bowl/shower pan 18 can be subsequently chemically welded via suitable adhesive that is recommended by the solid surface material manufacturer in either a convex or concave position to a countertop or curb assembly. After cooling and removal from the mold 12, the material is subsequently chemically welded to the countertop or a curb assembly in either a horizontal or a vertical plane. A supporting plate 19 is welded at the bottom of the drain hole 20, when the end product warrants a drain, as shown in FIG. 4.

Figure 3:
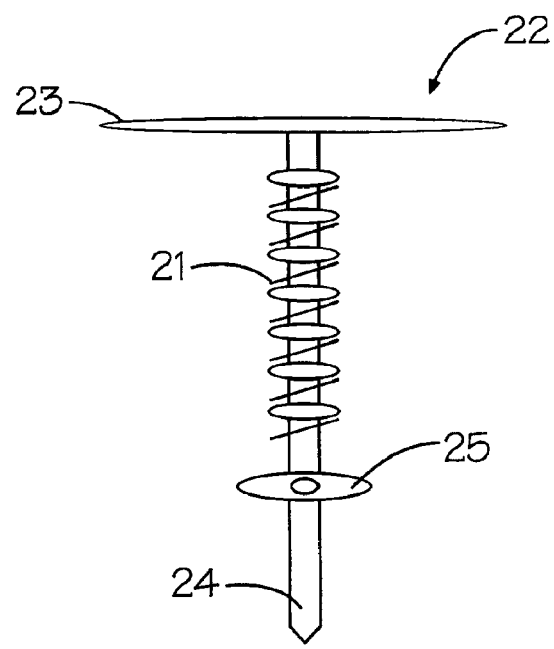
FIG. 3 shows a front view of a center spring-loaded elevator utilized in fabricating the shower pan.

Referring to FIG. 3, a center spring-loaded elevator 22 is illustrated. The center spring-loaded elevator 22 is placed in hole 14 during the vacuum forming (FIG. 7). The center spring-loaded elevator 22 comprises a disc 23 disposed on top of a rod 24. A spring 21 is wrapped about the rod 24, and a flat washer 25 holds the spring 21 in place about rod 24.

Figure 1:
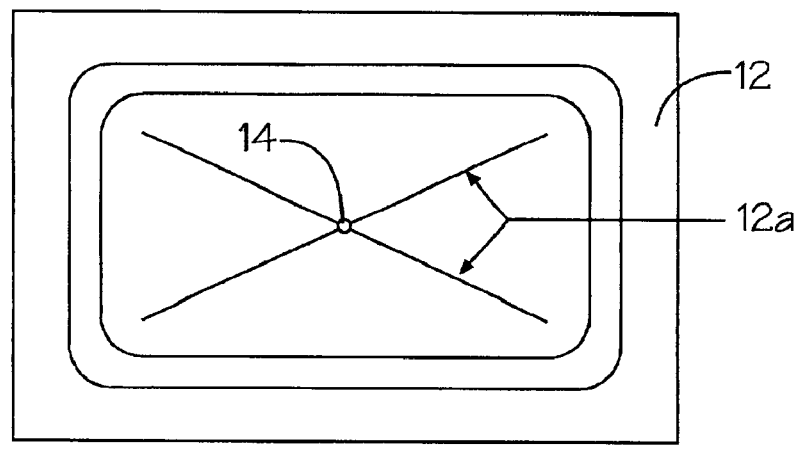
FIG. 1 illustrates a plan view of a mold used to fabricate a shower pan, in accordance with the method of this invention.

The center spring-loaded elevator 22 is placed in hole 14 of the mold 12, as shown in FIG. 7, and acts to regulate the vacuum pressure during the forming process. The top disc 23 closes over the hole 14 against the biasing of spring 21, when the vacuum pressure becomes too high. At this point, the vacuum veins 12a (FIG. 1) act as a bleeder point between the mold 12 and the solid surface material 18a, which allows air remaining between the mold 12 and the solid surface material 18a to be fully evacuated. When the molding process is complete, and at the time the counter-top or curb is welded to the flange 11, a drain plate 19 is placed under hole 20 to complete the shower base product 18 (FIG. 4).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of fabricating a fixture having a seamless depression capable of holding a liquid, utilizing a thermoforming process, said method comprising the steps of:
   a) placing a single-layer sheet, having predetermined outer dimensions, of heated, malleable, solid surface material in a vacuum mold having only a female cavity having inner dimensions, said outer dimensions of said single-layer sheet of material being greater than said inner dimensions of said female cavity, said vacuum mold including neither injection molding capability nor an internal source of heat;

b) creating a vacuum within said female cavity of said vacuum mold, said vacuum being substantially the only force acting upon said single-layer sheet in order to deform said single-layer sheet into a seamless, three-dimensional shape substantially conforming to said female cavity of said vacuum mold;

c) allowing the deformed material of step (b) to cool to a substantially rigid shape thereby producing the fixture; and d) removing the fixture from said vacuum mold.

2. The method in accordance with claim 1, wherein said deformed material comprises a flange portion, and wherein the method further comprises the step of:

e) constraining said single-layer sheet of solid surface material about said flange portion by means of a retaining ring prior to and during said vacuum creating step (b).

3. The method in accordance with claim 1, further comprising the step of:

e) bonding said fixture of step (d) to another component.

4. The method in accordance with claim 3 wherein said another component comprises one of the group: a countertop, and a curb.

5. A method of fabricating a fixture having a seamless depression capable of holding a liquid, utilizing a thermoforming process, said method comprising the steps of:

a) sizing a single-layer sheet of solid surface material having predetermined outer dimensions;

b) heating and placing said sized, single-layer sheet of solid surface material of step (a) in a vacuum mold having a cavity with inner dimensions, said outer dimensions of said single-layer sheet of material being greater than said inner dimensions of said cavity, said vacuum mold including neither injection molding capability nor an internal source of heat;

c) creating a vacuum within the said cavity of said vacuum mold in order to deform the material into a shape having a substantially seamless three-dimensional shape capable of holding a liquid, said vacuum being substantially the only force acting upon said single-layer sheet of solid surface material to cause said deformation;

d) allowing the deformed material of step (c) to cool to a substantially rigid shape thereby producing the fixture; and e) removing the fixture from said vacuum mold.

6. The method in accordance with claim 5, wherein said deformed material comprises a flange portion, and wherein the method further comprises the step of:

f) constraining said single-layer sheet of solid surface material about said flange portion by means of a retaining ring, prior to and after said vacuum creating step (c).

7. The method in accordance with claim 5, further comprising the step of:

f) bonding said fixture of step (e) to another component.

8. The method in accordance with claim 7, wherein said another component comprises one of the group: a countertop, and a curb.

* * * * *